United States Patent [19]

Kovacs

[11] Patent Number: 5,430,545
[45] Date of Patent: Jul. 4, 1995

[54] FIBER OPTIC ANGULAR RATE SENSOR INCLUDING ARRANGEMENT FOR REDUCING OUTPUT SIGNAL DISTORTION

[75] Inventor: Robert A. Kovacs, West Orange, N.J.

[73] Assignee: AlliedSignal Inc., Morris Township, N.J.

[21] Appl. No.: 263,113

[22] Filed: Jun. 21, 1994

[51] Int. Cl.⁶ .................................. G01C 19/64
[52] U.S. Cl. ...................................... 356/350
[58] Field of Search ............................ 356/350

[56] References Cited

U.S. PATENT DOCUMENTS 5,280,339  1/1994  Hollinger et al. ............... 356/350

Primary Examiner—Vincent P. McGraw
Attorney, Agent, or Firm—Howard G. Massung

[57] ABSTRACT

A fiber optic rate sensor includes an arrangement for suppressing transient spikes in a signal corresponding to the phase difference between light traveling in clockwise and counterclockwise directions around a fiber optic coil. The arrangement is such that the signal having the transient spikes is clamped or switched at the times the spikes are active.

10 Claims, 2 Drawing Sheets

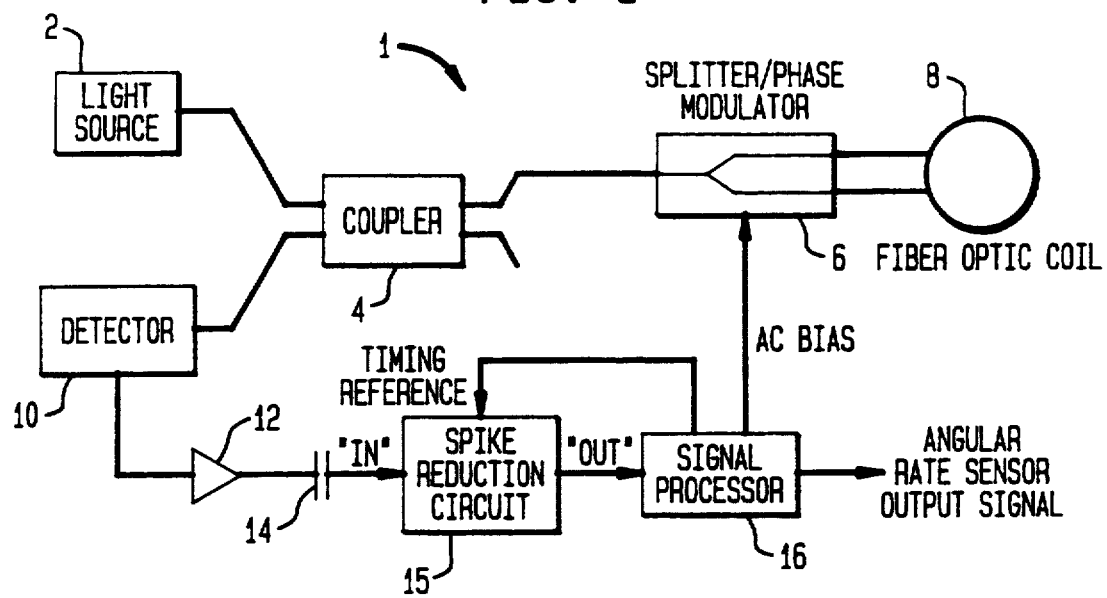
FIG. 1
FIG. 2
FIG. 3
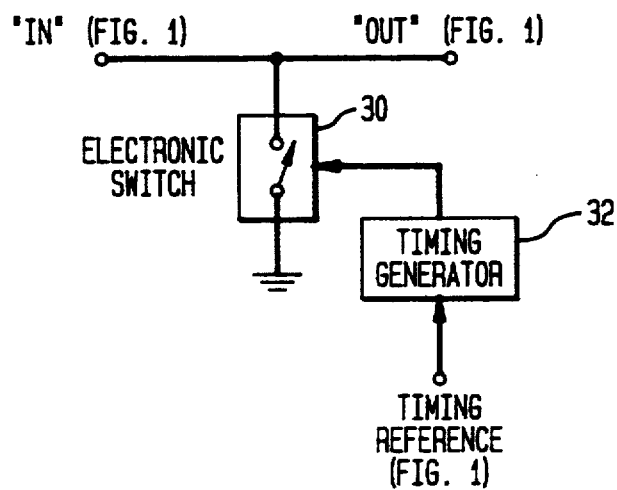
FIG. 4

FIBER OPTIC ANGULAR RATE SENSOR INCLUDING ARRANGEMENT FOR REDUCING OUTPUT SIGNAL DISTORTION

BACKGROUND OF THE INVENTION

This invention relates generally to fiber optic angular rate sensors using square wave phase modulation. More particularly, this invention relates to an angular rate sensor of the type described having reduced output signal distortion for improved performance. Still more particularly, this invention relates to an angular rate sensor using square wave phase modulation and including means for suppressing transient jumps or spikes which degrade and distort the angular rate sensor output signal, without modifying the signal processing configuration of the sensor.

Transient jumps or spikes in the output signal of an angular rate sensor are inherent in both open and closed loop angular rate sensors using square wave phase modulation. These spikes are undesirable since they contain no useful angular rate information and serve only to degrade or distort the useable portion of the output signal.

Prior to the present invention, attempts have been made to minimize the effect of these spikes by minimizing the rise and fall times of a bias signal provided in the angular rate sensor arrangement, or by electronically filtering the angular rate sensor output signal via a low pass filter. Both of these arrangements have significant disadvantages.

Minimizing the rise and fall times of a bias signal requires a bias signal generator having increased power consumption and bandwidth. While this arrangement reduces the duration of the spike, the spike is not entirely eliminated. Additionally, increased bandwidth results in an undesirable increased susceptibility to modulation noise.

Filtering the output signal reduces the amplitude of the spike but the amount of filtering which can be applied is limited since the energy in the spike spreads out to degrade or distort the output signal. Additionally, in a closed loop fiber optic angular rate sensor, the generated signal is usually highly amplified to increase the sensitivity of error signal detection. The presence of a spike results in a signal which is far beyond the dynamic range of amplifiers providing the high amplification so as to overload the amplifiers. Additional signal distortion occurs as the amplifiers recover from this overload.

Accordingly, the present invention provides an arrangement for suppressing spikes in the angular rate sensor output signal for improving angular rate sensor performance characteristics including random walk and bias stability. Additionally, scale factor linearity and scale factor stability are also improved.

SUMMARY OF THE INVENTION

This invention contemplates a fiber optic angular rate sensor including an arrangement for reducing output signal distortion. The angular rate sensor is of the type wherein light from a light source is applied to an optical fiber and is directed by a coupler to a splitter/phase modulator so that the light is directed into both ends of a fiber optic sensing coil for traveling therearound in clockwise and counterclockwise directions. Light exits the coil and is recombined by the splitter/phase modulator and is thereupon applied to a detector via the coupler. The detector converts the light energy into an electrical error signal corresponding to the phase difference between the clockwise and counterclockwise traveling light, and which error signal is applied to a signal processor which provides an angular rate sensor output. A spike reduction circuit is disposed between the detector and the signal processor. A timing reference for the spike reduction circuit and a bias function for the splitter/phase modulator are generated by the signal processor. The arrangement is such that the occurrence of a spike is synchronized with the bias function, whereby the spike is replaced with a less disadvantageous signal. This is achieved by electrically switching or clamping the signal applied to the signal processor at the time the spike is active.

BRIEF DESCRIPTION OF THE DRAWINGS

FIG. 1 is a block diagram of an angular rate sensor according to the invention.

FIGS. 2 and 3 are graphical representations illustrating signal waveforms occurring at various points in the block diagram shown in FIG. 1.

FIG. 4 is a block diagram illustrating one form of the spike reduction circuit shown generally in FIG. 1.

DETAILED DESCRIPTION OF THE INVENTION

Figure 5:
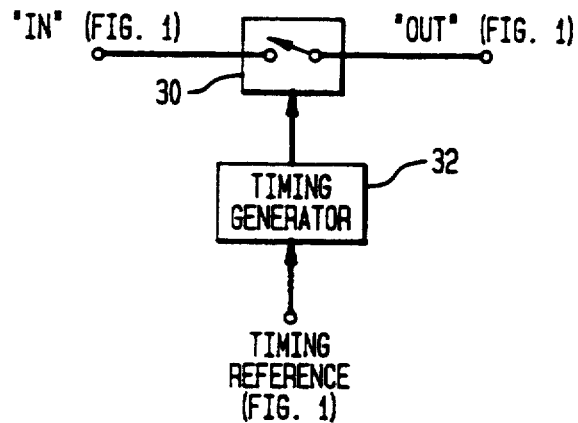
FIG. 5 is a block diagram of another form of the spike reduction circuit shown generally in FIG. 1.

FIG. 1 illustrates a closed loop fiber optic angular rate sensor or gyroscope (gyro) designated by the numeral 1. Light from a light source 2 is directed by an optical coupler 4 to a splitter/phase modulator 6 and therefrom into both ends of a fiber optic coil 8. Light exits coil 8 and is recombined in the splitter/phase modulator, and is applied via coupler 4 to a detector 10. Detector 10 converts the light energy into an electrical signal which is amplified by an amplifier 12 and applied through a DC isolation capacitor 14 to a signal processor 16.

Angular rate sensors of the type contemplated are more fully described in commonly assigned U.S. Pat. Nos. 5,278,631 and 5,280,339, issued to W. Holinger, K. Killian and R. Kovacs on Jan. 11, 1994 and Jan. 18, 1994, respectively, said description being incorporated herein by reference.

In accordance with the present invention, the output from detector 10 applied through amplifier 12 and capacitor 14 is applied as an "in" signal to a spike reduction circuit 15 disposed between capacitor 14 and signal processor 16. Spike reduction circuit 15 provides an "out" signal which is applied to signal processor 16.

The arrangement is such that a light beam from light source 2 travels around coil 8 in clockwise and counterclockwise directions. The phase difference between the clockwise and counterclockwise beams is detected by detector 10 which provides a corresponding analog error signal. The gain of the error signal is adjusted by amplifier 12 and is thereupon applied through capacitor 14 to spike reduction circuit 15, as aforenoted.

Signal processor 16 provides an angular rate sensor output signal, and provides an AC bias for splitter/phase modulator 6 and a timing reference for spike reduction circuit 15.

The "in" signal to spike reduction circuit 15 has a waveform as shown in FIG. 2. This signal includes transients or spikes 13. These spikes are undesirable, since they contain no angular rate information and serve only to distort and corrupt the useable portion of the angular rate sensor output signal. The presence of such a spike results in reduced performance of the angular rate sensor 1, as will be readily appreciated.

Figure 6:
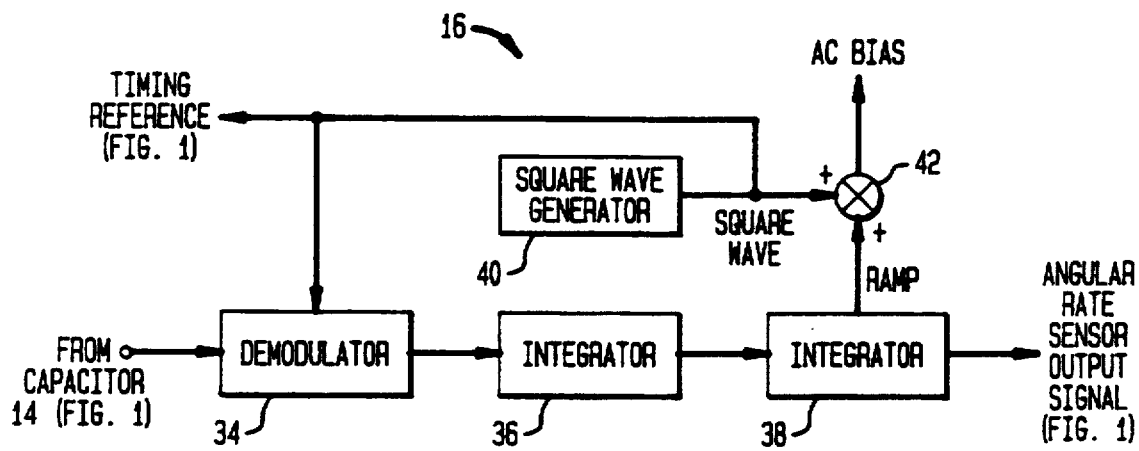
FIG. 6 is a block diagram of a signal processor shown generally in FIG. 1.

Signal processor 16 is more particularly illustrated in FIG. 6. Thus, signal processor 16 includes a demodulator 34 connected to capacitor 14, an integrator 36 connected to demodulator 34 and an integrator 38 connected to integrator 36. Integrator 38 provides the angular rate sensor output signal and provides a ramp output.

A square wave generator 40 provides a square wave output which is applied to a summing means 42. Summing means 42 adds the square wave output and the ramp output from integrator 38 to provide the AC bias for splitter/phase modulator 6.

The square wave output from square wave generator 40 is applied to demodulator 34 and which square wave output is applied to spike reduction circuit 15 as the timing reference for the spike reduction circuit.

Thus, the present invention improves the performance of angular rate sensor 1 by suppressing the transient spikes 13 to prevent said spikes from entering signal processor 16. With spikes 13 so suppressed, a clean signal is available for subsequent processing. The additional electronics required to implement the invention is not complex as will be hereinafter discerned from a description of same, and which will be recognized as advantageous.

Further, the requirement for wide band, short rise time modulation signals is relaxed, which tends to reduce noise, power consumption and component cost. Also, the application of extended low pass filtering to reduce random noise in the amplified signal waveform from amplifier 12 is minimized.

Thus, in accordance with the invention, the "out" signal from spike reduction circuit 15 has a "smoothed" waveform as shown in FIG. 3, i.e. without spikes 13 shown in FIG. 2.

Two implementations of spike reduction circuit 15 are illustrated in FIGS. 4 and 5, respectively. The embodiment shown in FIG. 4 illustrates a shunt configuration and the embodiment shown in FIG. 5 illustrates a series configuration.

With reference then to FIGS. 5 and 6, wherein corresponding components carry corresponding numerical designations, a normally open electronic switch is designated by the numeral 30 and a timing generator is designated by the numeral 32. Timing generator 32 is driven by the timing reference from signal processor 16. The timing generator provides an output which closes and opens electronic switch 30 in a timed sequence. It will be appreciated that with the arrangement described the temporal occurrence of spikes 13 is synchronized with the AC bias from signal processor 16. Accordingly, it is possible to replace the spiked signal (FIG. 2) with something more benign (FIG. 3). This is accomplished by electrically switching and/or clamping (FIG. 5) the spiked signal, i.e. closing normally open switch 30, at the time the spikes are active (FIGS. 4 and 5).

Thus, the disclosed spike reduction circuit improves angular rate sensor or gyro performance by suppressing transient spikes in the "in" signal, and prevents the spiked signal from entering signal processor 16. With the spikes removed, a clean "out" signal is available for processing. The above is accomplished with relatively simple circuitry as will be recognized as advantageous.

With the above description of the invention in mind, reference is made to the claims appended hereto for a definition of the scope of the invention.

What is claimed is:

1. A fiber optic angular rate sensor, comprising:
   a light source for applying light to an optical fiber;
   means for directing the light applied to the optical fiber to a splitter/phase modulator means, whereby the light is split and directed into both ends of a fiber optic coil for traveling therearound in clockwise and counterclockwise directions;
   said light exiting the both coil ends and being combined by the splitter/phase modulator means;
   the combined light being directed by the directing means to a detector means, said detector means detecting the combined light and converting said combined light into an electrical signal corresponding to the phase difference between the clockwise and counterclockwise traveling light, said electrical signal having transient spikes;
   means connected to the detector for suppressing the transient spikes and for providing a signal without said transient spikes;
   means for processing the signal without the transient spikes from the transient spike suppressing means to provide an angular rate sensor output signal, and to provide a bias for the splitter/phase modulator means and a timing reference for the transient spike suppressing means; and
   the timing reference being applied to the transient spike suppressing means, so that the occurrence of said spikes is synchronized with said bias, whereby the signal having said transient spikes is replaced by the signal without said spikes.

2. A fiber optic angular rate sensor as described by claim 1, wherein the means connected to the detector for suppressing the transient spikes and for providing a signal without said transient spikes includes:
   normally open switching means connected between the detector means and the signal processing means; and
   a timing generator connected to the normally open switching means in a shunt configuration, and being responsive to the timing reference for providing an output for closing and opening said switching means in a timed sequence to provide the signal without said spikes.

3. A fiber optic angular rate sensor as described by claim 1, wherein the means connected to the detector for suppressing the transient spikes and for providing the signal without said transient spikes includes:
   switching means connected between the detector means and the signal processing means; and
   a timing generator connected to the switching means in a series configuration and being responsive to the timing reference for providing an output for closing and opening the switching means in a timed sequence to provide the signal without said transient spikes.

4. A fiber optic angular rate sensor as described by claim 1, wherein the means connected to the detector for suppressing the transient spikes and for providing a signal without said transient spikes includes:
   means for clamping the electrical signal having said transient spikes at the times the spikes are active.

5. A fiber optic angular rate sensor as described by claim 1, wherein the means connected to the detector for suppressing the transient spikes and for providing a signal without said transient spikes includes:
   means for switching the electrical signal having said transient spikes at the times the spikes are active.

6. A fiber optic angular rate sensor as described by claim 1, wherein the means for processing the signal without the transient spikes includes:
   demodulator means for demodulating the electrical signal having transient spikes and for providing a demodulated signal;
   first integrator means for integrating the demodulated signal and for providing a first integrated signal;
   second integrator means for integrating the first integrated signal to provide the angular rate sensor output signal and to provide a ramp output;
   square wave generator means for providing a square wave output, said square wave output being the timing reference for the transient spike suppressing means; and
   means for adding the ramp output and the square wave output to provide the bias for the splitter/phase modulator means.

7. A method for reducing distortion in the output signal of an optical rate sensor, including:
   applying light from a light source to an optical fiber;
   splitting the applied light and directing the split light into both ends of a fiber optic coil for traveling around the coil in clockwise and counterclockwise directions, said light exiting both coil ends;
   combining the exiting light;
   directing the combined light to a detector for converting the combined light into an electrical signal corresponding to the phase difference between the clockwise and counterclockwise traveling light, said electrical signal having transient spikes;
   suppressing the transient spikes and providing a signal without said spikes;
   processing the signal without said transient spikes for providing the angular rate sensor output signal, and for providing a bias and a timing reference;
   applying the bias for biasing the light splitting and the light combining; and
   applying the timing reference to effect suppressing the transient spikes so that the occurrence of said spikes is synchronized with the bias for replacing the signal having transient spikes with the signal without said transient spikes.

8. A method as described by claim 7, wherein suppressing the transient spikes includes:
   switching the electrical signal having the transient spikes at the times said spikes are active.

9. A method as described by claim 7, wherein suppressing the transient spikes includes:
   clamping the electrical signal having the transient spikes at the times said spikes are active.

10. A method as described by claim 7, wherein processing the signal without transient spikes includes:
   demodulating said signal without said transient spikes and providing a demodulated signal;
   integrating the demodulated signal and providing a first integrated signal;
   integrating the first integrated signal and providing the angular rate sensor output signal, and providing a ramp output;
   providing a square wave output;
   adding the square wave output and the ramp output to provide the bias; and
   using the square wave output as the timing reference.

* * * * *